US010718499B1

(12) United States Patent
DiFelice et al.

(10) Patent No.: US 10,718,499 B1
(45) Date of Patent: Jul. 21, 2020

(54) RIGID PENDANT MOUNTED LINEAR LUMINAIRE WITH A CLEVIS SWIVEL JOINT

(71) Applicant: Eaton Intelligent Power Limited, Dublin (IE)

(72) Inventors: Eric DiFelice, Aurora, CO (US); John Strom, Commerce City, CO (US)

(73) Assignee: Signify Holding B.V., Eindhoven (NL)

( * ) Notice: Subject to any disclaimer, the term of this patent is extended or adjusted under 35 U.S.C. 154(b) by 0 days.

(21) Appl. No.: 16/285,707

(22) Filed: Feb. 26, 2019

(51) Int. Cl.
*F21V 21/104* (2006.01)
*F16M 11/10* (2006.01)
*F16M 13/02* (2006.01)
*F16C 11/06* (2006.01)
*F16M 11/20* (2006.01)
*F21Y 103/00* (2016.01)

(52) U.S. Cl.
CPC ........ *F21V 21/104* (2013.01); *F16C 11/0695* (2013.01); *F16M 11/10* (2013.01); *F16M 11/2078* (2013.01); *F16M 13/027* (2013.01); *F21Y 2103/00* (2013.01)

(58) Field of Classification Search
CPC ... F21V 21/104; F16C 11/0695; F16M 11/10; F16M 11/2078; F16M 13/027
USPC .................................................... 362/217.12
See application file for complete search history.

(56) References Cited

U.S. PATENT DOCUMENTS

| | | | | |
|---|---|---|---|---|
| 2,426,436 A * | 8/1947 | Cochener | ............... | F21V 21/14 362/371 |
| 2,461,786 A * | 2/1949 | Terr | ........................ | F21V 21/00 362/404 |
| 5,624,198 A * | 4/1997 | Fuchs | ..................... | F16C 11/06 248/278.1 |
| 7,780,318 B2 * | 8/2010 | Xiao | ...................... | F21V 21/30 362/371 |
| 8,414,164 B2 * | 4/2013 | Ogawa | .................... | F21S 8/043 362/373 |
| 2003/0137843 A1* | 7/2003 | Mier-Langner | ..... | F21V 19/0085 362/285 |
| 2006/0000634 A1* | 1/2006 | Arakawa | ................... | F21S 8/06 174/128.1 |
| 2007/0164179 A1* | 7/2007 | Rice | ........................ | F21S 8/06 248/200 |
| 2007/0246631 A1* | 10/2007 | Brown | .................. | F21V 21/104 248/343 |
| 2009/0040774 A1* | 2/2009 | Avila | ...................... | F21V 21/28 362/371 |
| 2010/0177511 A1* | 7/2010 | Yu | .......................... | F21V 15/01 362/217.05 |
| 2010/0259944 A1* | 10/2010 | Hopkins | .................. | F21S 8/06 362/404 |

* cited by examiner

Primary Examiner — Bryon T Gyllstrom
(74) Attorney, Agent, or Firm — King & Spalding LLP

(57) ABSTRACT

A lighting system includes a linear luminaire having a length and a width, where the length is longer than the width. Further, the lighting system includes at least two rigid pendants that are configured to suspension mount the linear luminaire from a mounting surface. Each rigid pendant is coupled to the linear luminaire via a clevis such that a joint between the rigid pendants and the linear luminaire is a clevis swivel joint that allows the linear luminaire to swing along the length to meet a seismic requirement while preventing a tilting of the linear luminaire along the width.

16 Claims, 9 Drawing Sheets

RIGID PENDANT MOUNTED LINEAR LUMINAIRE WITH A CLEVIS SWIVEL JOINT

TECHNICAL FIELD

Embodiments of the present disclosure relate generally to luminaires, and more particularly to a rigid pendant mounted linear luminaire with a clevis swivel joint.

BACKGROUND

Locations that are subject to earthquakes require luminaires to be designed to meet certain seismic requirements, such as being able to move/sway to prevent damage and injury. Existing solutions for meeting the seismic requirement in luminaires, such as linear luminaires 100 that are rigid pendant mounted include providing a full swivel at the joint 108 between the ceiling 104 and the rigid pendant 106 and at the joint 102 between the luminaires 100 and the rigid pendant 106 as illustrated in FIG. 1. The full swivel at both ends of the rigid pendant 106 allows a full range motion along the long side (length) 112 and short side (width) 114 of the linear luminaires 100. That is, the linear luminaires 100 can both swing (along the length and width) and tilt. However, as illustrated in FIGS. 2-3, once the linear luminaires 100 are tilted from their default position where they are level, they may remain tilted and may not return back to their default position without application of an external force by a user or any other appropriate means. That is, while the full swivel at both ends of the rigid pendant 106 provides a full range of motion to the linear luminaires 100 to meet the seismic requirement, there is a propensity for the linear luminaires 100 to become and remain tilted or un-level, as illustrated in FIGS. 2-3, which may be undesirable.

Other existing solutions for meeting the seismic requirements in linear luminaires that are rigid pendant mounted include providing a full swivel at the joint between the ceiling and the rigid pendant while keeping the joint 402 between the luminaires 410 and the rigid pendant 406 fixed as illustrated in FIG. 4. While keeping the joint 402 between the luminaires 410 and the rigid pendant 406 fixed prevents the tilting of the linear luminaires 410, the fixed joint also limits the swing of the linear luminaires 100 along the length of the linear luminaires 100, thereby failing to meet the seismic requirements.

This background information is provided to reveal information believed to be of possible relevance to the present disclosure. No admission is necessarily intended, nor should it be construed, that any of the preceding information constitutes prior art against the present disclosure.

SUMMARY

In one aspect, the present disclosure relates to a lighting system that includes a linear luminaire. The linear luminaire includes a frame that is defined by a pair of side rails and a pair of end plates. The side rails define a length of the linear luminaire and the end plates that are shorter than the side rails define a width of the linear luminaire. Further, the linear luminaire includes a light source disposed in an inner cavity defined by the frame, and at least two rigid pendants that are configured to suspension mount the linear luminaire from a mounting surface. Each rigid pendant is coupled to the linear luminaire via a clevis that prevents a tilting of the linear luminaire about a longitudinal axis of the linear luminaire, while allowing a movement of the linear luminaire along the longitudinal axis. The longitudinal axis of the linear luminaire is an axis that is parallel to the side rails and transverse to the end plates of the linear luminaire.

In another aspect, the present disclosure relates to a lighting system that includes a linear luminaire having a length and a width. The length is longer than the width. Further, the linear luminaire includes at least two rigid pendants that are configured to suspension mount the linear luminaire from a mounting surface. Each rigid pendant is coupled to the linear luminaire via a clevis that allows the linear luminaire to swing along the length such that the linear luminaire meets a seismic requirement while preventing a tilting of the linear luminaire along about a longitudinal axis along the length.

In yet another aspect, the present disclosure relates to a method that includes providing a linear luminaire having a length and a width. The length being longer than the width. The method further includes providing at least two rigid pendants that are configured to suspension mount the linear luminaire from a mounting surface. The linear luminaire and the at least two rigid pendants are configured to be coupled via a clevis such that a joint between each pendant and the linear luminaire is a clevis swivel joint that allows the linear luminaire to swing along the length such that the linear luminaire meets a seismic requirement while preventing a tilting of the linear luminaire about a longitudinal axis along the length.

These and other aspects, objects, features, and embodiments, will be apparent from the following description and the appended claims.

BRIEF DESCRIPTION OF THE FIGURES

The foregoing and other features and aspects of the present disclosure are best understood with reference to the following description of certain example embodiments, when read in conjunction with the accompanying drawings, wherein.

Figure 1:
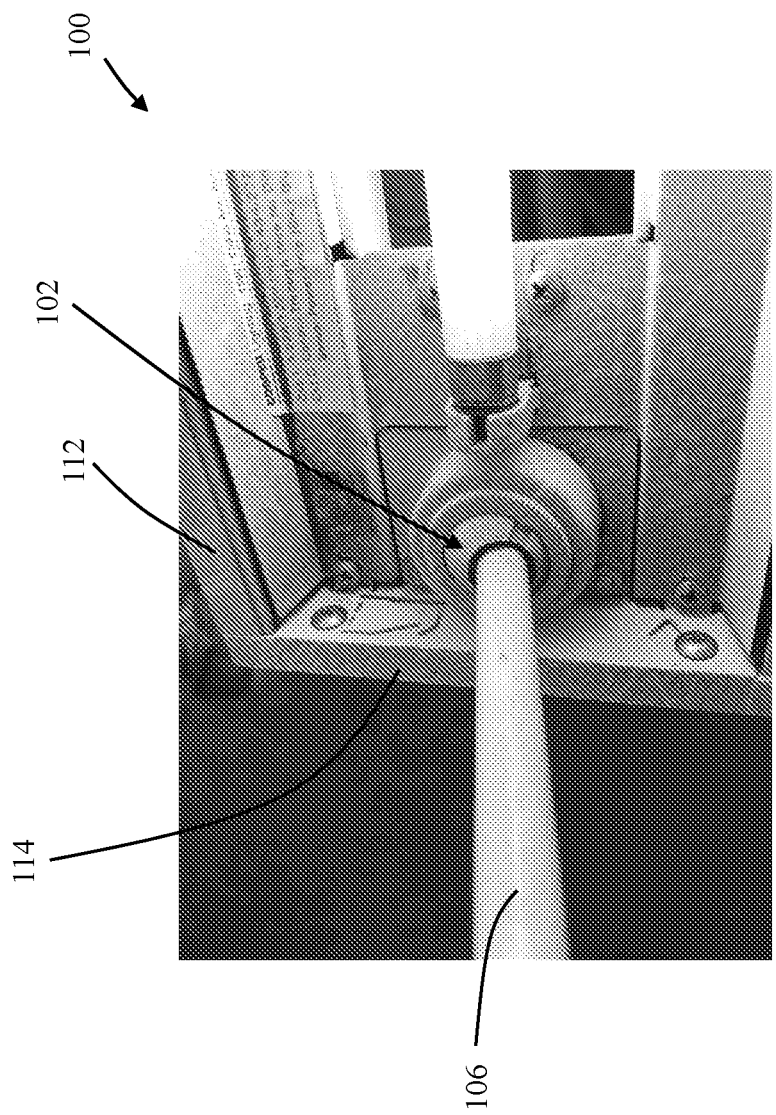
FIG. 1 illustrates a full swivel joint between a rigid pendant and a linear luminaire, in accordance with a prior art luminaire.
Figure 3:
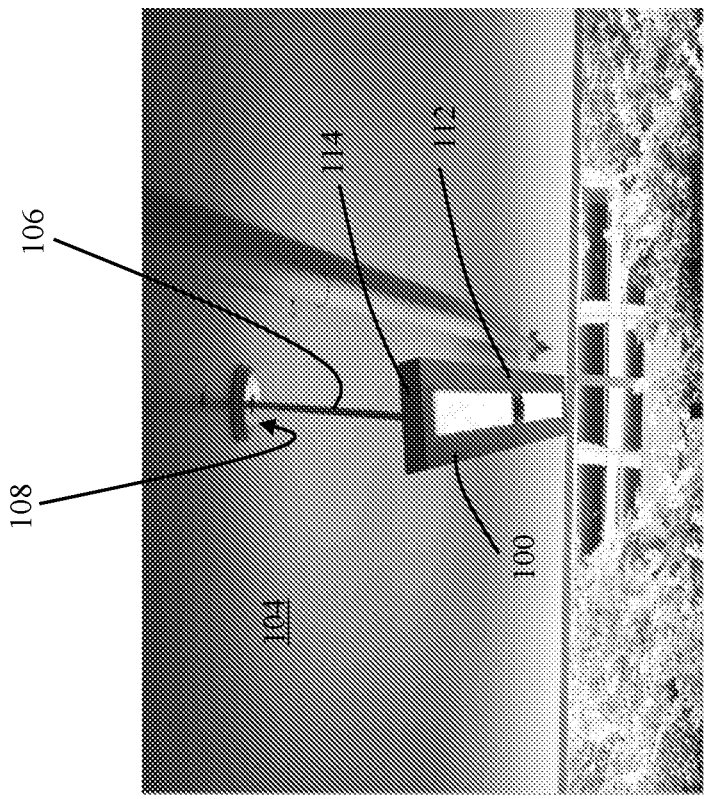
FIGS. 2-3 illustrate the linear luminaire of FIG. 1 remaining in a tilted position without returning back to a default position that is level, in accordance with a prior art luminaire.
Figure 2:
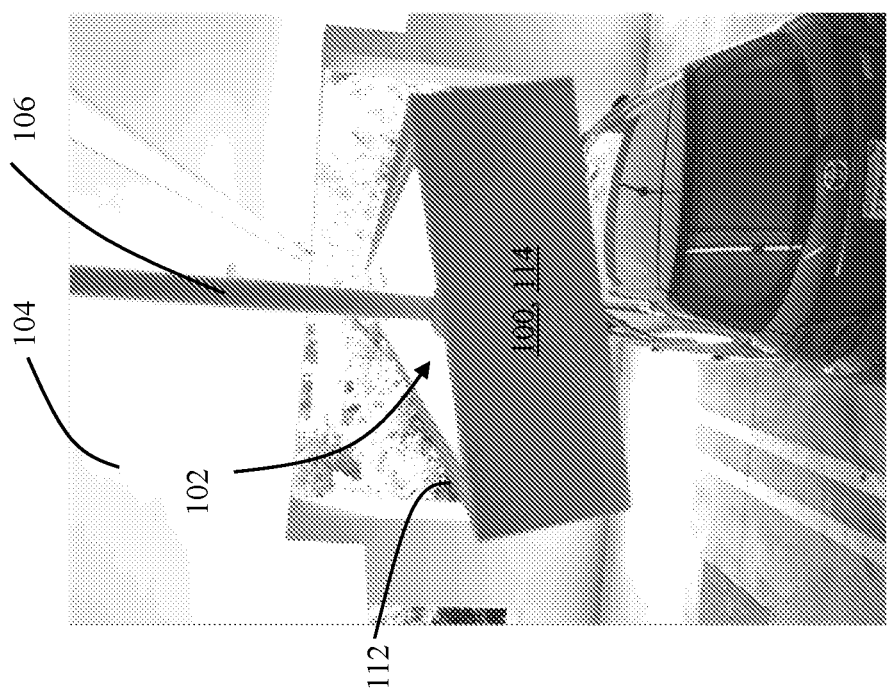
Figure 4:
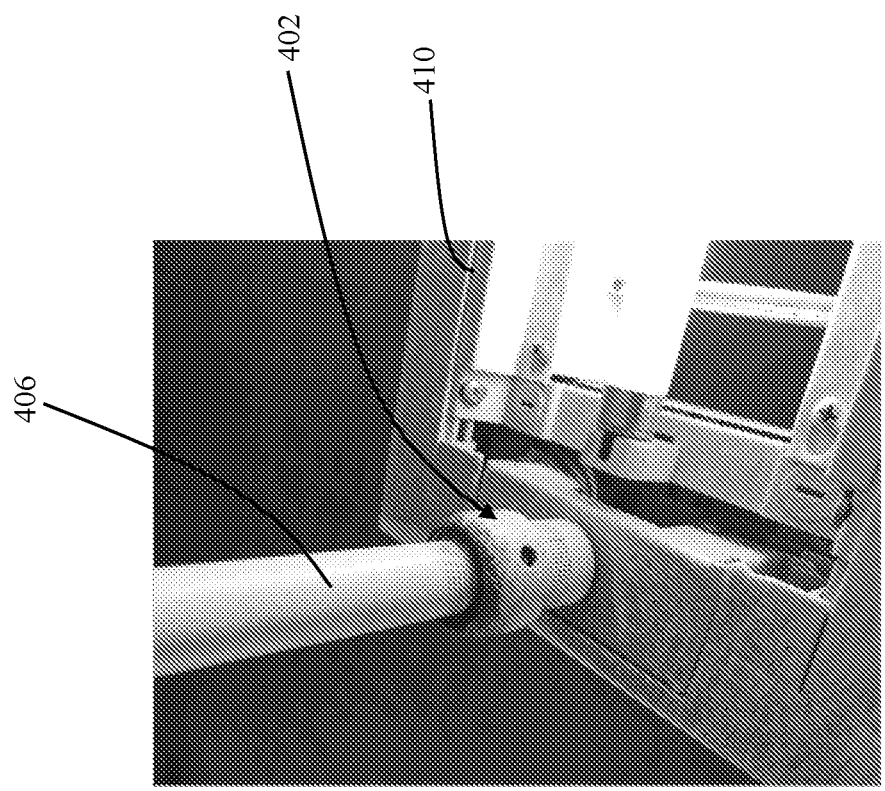
FIG. 4 illustrates a fixed joint between a rigid pendant and another linear luminaire, in accordance with a prior art luminaire.

The drawings illustrate only example embodiments of the present disclosure and are therefore not to be considered limiting of its scope, as the present disclosure may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles.

DETAILED DESCRIPTION OF EXAMPLE EMBODIMENTS

In the following paragraphs, a rigid pendant mounted linear luminaire with a clevis swivel joint will be described in further detail by way of examples with reference to the attached drawings. In the description, well-known components, methods, and/or processing techniques are omitted or are briefly described so as not to obscure the disclosure. As used herein, the "present disclosure" refers to any one of the embodiments of the disclosure described herein and any equivalents. Furthermore, reference to various feature(s) of the "present disclosure" is not to suggest that all embodiments must include the referenced feature(s).

An example linear luminaire of the present disclosure that is pendant mounted includes a rigid pendant that suspends the linear luminaire from a mounting surface, such as a ceiling. The rigid pendant is coupled to the linear luminaire via a clevis swivel joint that allows a movement of the linear luminaire in a long direction (along length) such that the linear luminaire meets seismic requirements, while limiting the movement/unleveling or tilting of the linear luminaire in a short direction (along width).

Moving now to discuss the figures, FIGS. 5-10 illustrate an example embodiment of the rigid pendant mounted linear luminaire with the clevis swivel joint. It is noted that FIGS. 5-9 illustrate the example rigid pendant mounted linear luminaire with the clevis swivel joint in its swiveled position, i.e., the example linear luminaire is swiveled from its default position 1002 (shown in FIG. 10) along its long side (length) or along the longitudinal axis 515 (shown in FIG. 5).

Referring to FIGS. 5-10, the linear luminaire 500 may include a pair of side rails 504 and a pair of end plates 506 that are arranged such that they form a frame 502 that is substantially cuboid shaped. The side rails 504 may define the long sides 508 and/or the length 'l' of the linear luminaire 500, while the end plates 506 that are shorter than the side rails 504 may define the short sides 510 or width 'w' of the linear luminaire 500. The frame 502 may define an inner cavity 702 (shown in FIG. 7) that is configured to house a light assembly mounting structure 704 and a light assembly 706 of the linear luminaire 500 therein. The light assembly mounting structure 704 may be configured to hold the light assembly 706 within the inner cavity 702 defined by the frame 502 of the linear luminaire 500 as illustrated in FIGS. 5-10. The light assembly 706 may include a light source 708 (shown in FIG. 7) and optical features 710 that are configured to control light exiting the linear luminaire 500 towards an area that is to be illuminated. The light source 708 may include, but is not limited to, a florescent lamp, light emitting diodes (LEDs), etc., and the optical features 710 may include, but are not limited to, one or more diffuser lenses, reflectors, etc.

Figure 5:
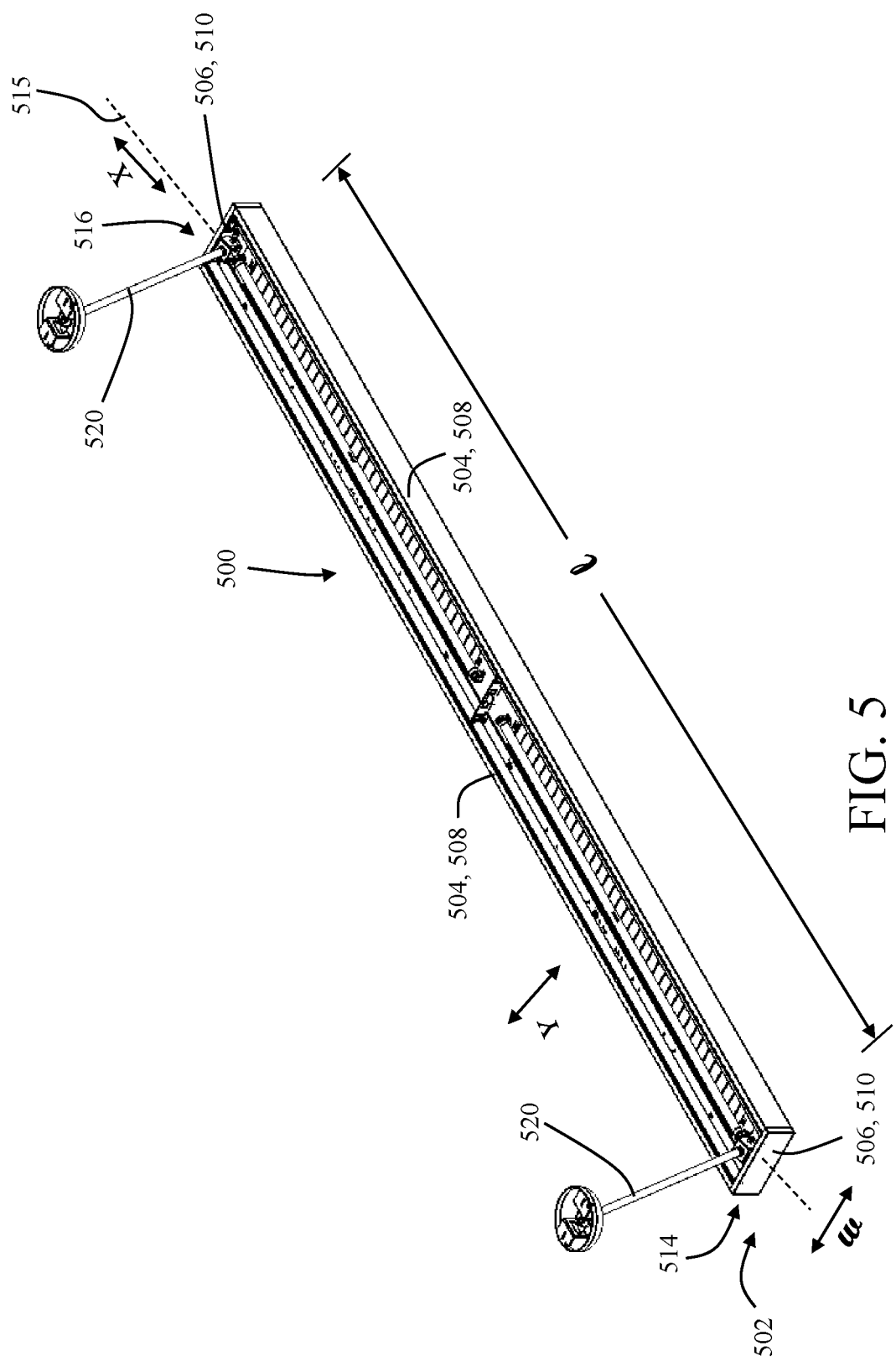
FIG. 5 illustrates a perspective view of an example linear luminaire that includes a clevis swivel joint, the example linear luminaire being in a swiveled position, in accordance with example embodiments of the present disclosure.
Figure 9:
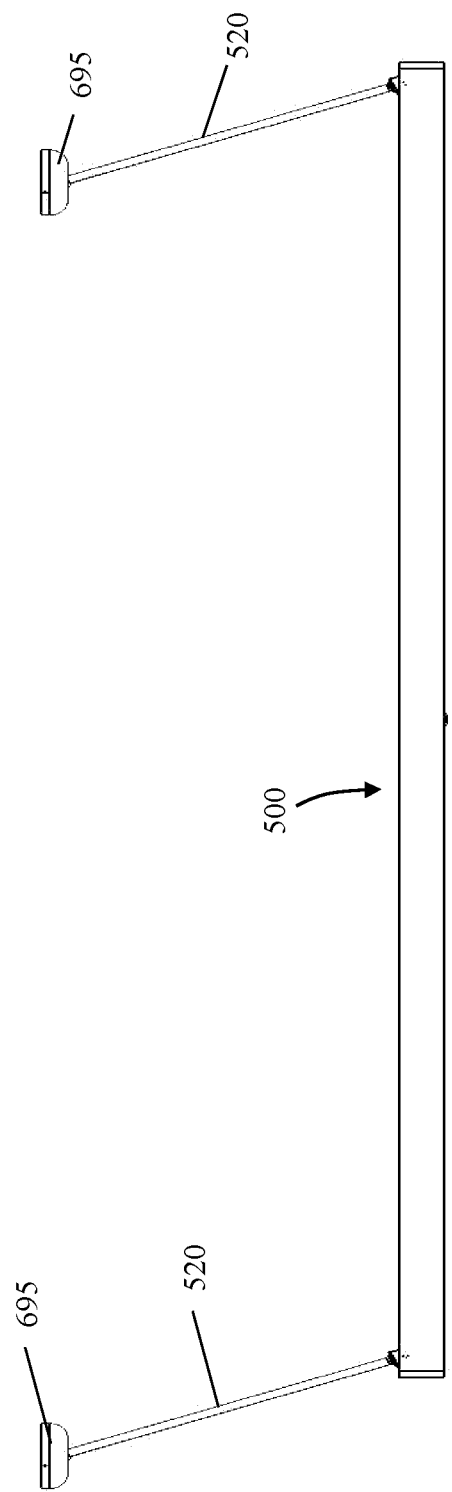
FIG. 9 illustrates a front view (looking at the long side) of the example linear luminaire of FIG. 5 in the swiveled position, in accordance with example embodiments of the present disclosure.
Figure 10:
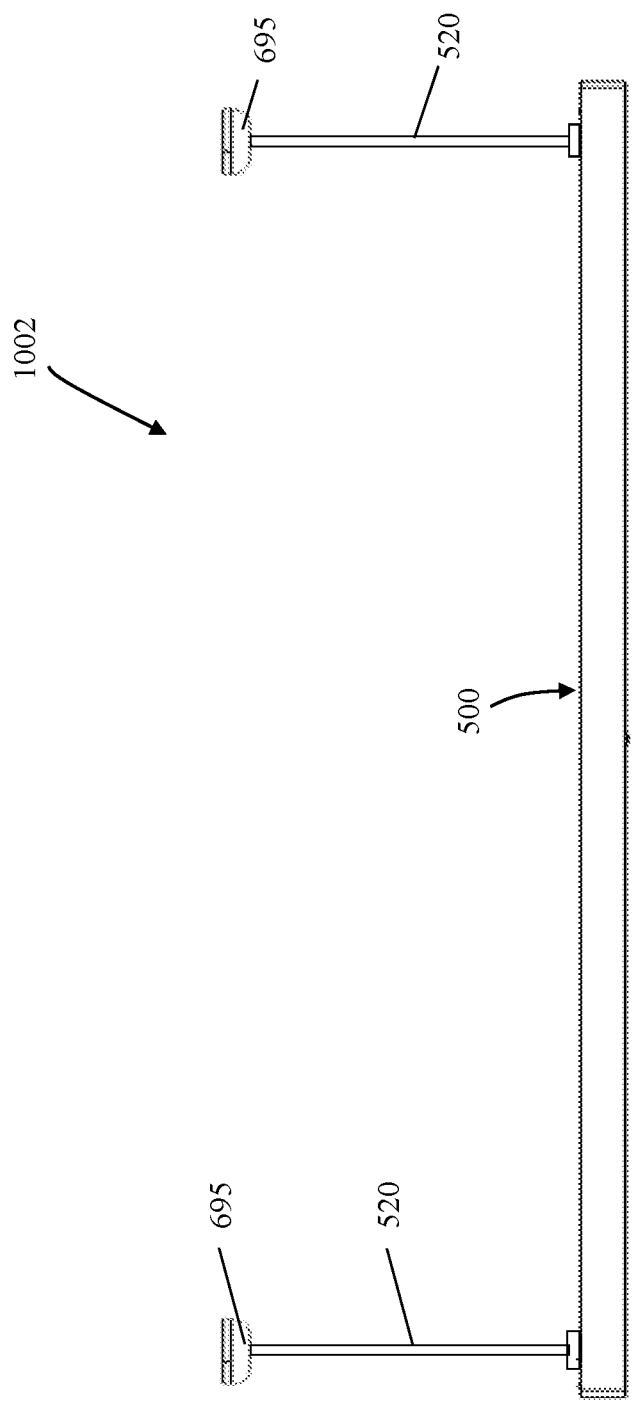
FIG. 10 illustrates a front view (looking at the long side) of the example linear luminaire of FIG. 5 in a default position, in accordance with example embodiments of the present disclosure.

Further, the linear luminaire 500 may include mounting plates 712 that are disposed adjacent the end plates 506 of the linear luminaire 500. The mounting plates 712 may be disposed on opposite ends (514, 516) of the linear luminaire 500 and may have mounting brackets 714 coupled thereto. In some example embodiments, the mounting brackets 714 may be removably coupled to the mounting plate 712 using appropriate fasteners. However, in other example embodiments, the mounting brackets 714 may be fixedly coupled to and integral with the mounting plate 712. The mounting brackets 714 may be configured to allow the linear luminaire 500 to be suspension mounted. For example, as illustrated in FIGS. 5 and 9-10, the linear luminaire 500 may be suspension mounted using two rigid pendants 520.

The rigid pendants 520 may be hollow cylindrical rods that are configured to: (a) suspension mount the linear luminaire 500 from a mounting surface, such as a ceiling; and/or (b) route electrical wires therethrough, the electrical wires extending between a power source and the light source 708 of the linear luminaire 500. As illustrated in FIGS. 5-10, each rigid pendant 520 may be coupled to the mounting surface at a first end 610 and to the linear luminaire 500 at a second end 710, where the second end 710 is opposite to the first end 610. In particular, the first end 610 of each rigid pendant 520 may be coupled to the mounting surface such that a joint 612 between the mounting surface and the rigid pendant 520 may be a full swivel joint that allows a full range of motion in a direction 'X' (shown in FIG. 5) along the long side 508 or the length 'l' of the linear luminaire 500 and in a direction 'Y' (shown in FIG. 5) along the short side 510 or width 'w' of the linear luminaire 500. Further, the second end 710 of each rigid pendant 520 may be coupled to the linear luminaire 500 such that a joint 725 between the rigid pendant 520 and the linear luminaire 500 may be a clevis swivel joint that allows the linear luminaire 500 to move (swing) in the direction 'X' along the long side 508 and/or the length 'l' of the linear luminaire while preventing a rotational movement/unleveling of the linear luminaire 500 about the longitudinal axis 515 and along the short side 510 of the linear luminaire 500.

In other words, the clevis swivel joint 725 between the rigid pendant 520 and the linear luminaire 500 limits the range of motion of the linear luminaire 500 to one direction, i.e., the direction X along the long side 508 or the length 'l' of the linear luminaire 500, while preventing the tilting of the linear luminaire about the longitudinal axis 515 and along the short side 510 of the linear luminaire 500. The full swivel joint 612 enables the linear luminaire 500 to swing or move along the short side 510 or width 'w' of the linear luminaire 500, i.e., in direction Y. The ability to swing or move in the direction 'X' (shown in FIG. 5) along the long side 508 or the length 'l' of the linear luminaire 500 and in a direction 'Y' (shown in FIG. 5) along the short side 510 or width 'w' of the linear luminaire 500 allows the linear luminaire 500 to meet the seismic requirements.

Figure 6:
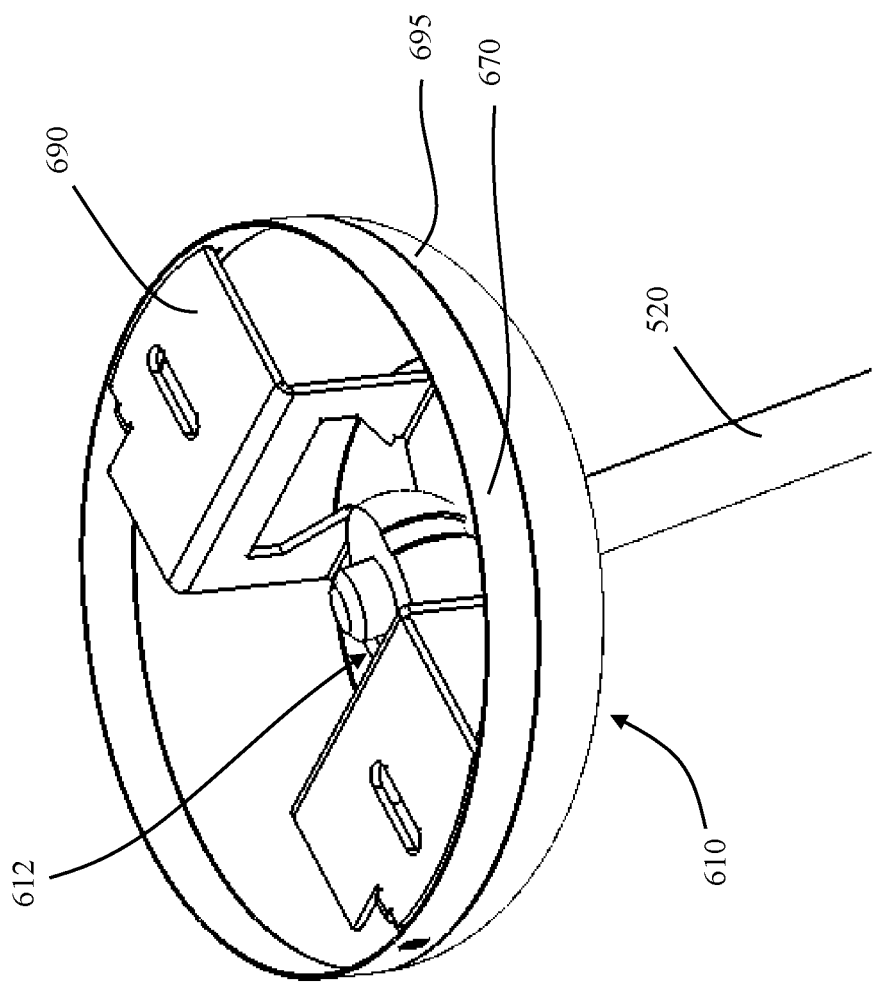
FIG. 6 illustrates an example full swivel joint at a first end of the rigid pendant where the rigid pendant will be coupled to a mounting surface to suspend the example linear luminaire of FIG. 5 from the mounting surface, in accordance with example embodiments of the present disclosure.
Figure 7:
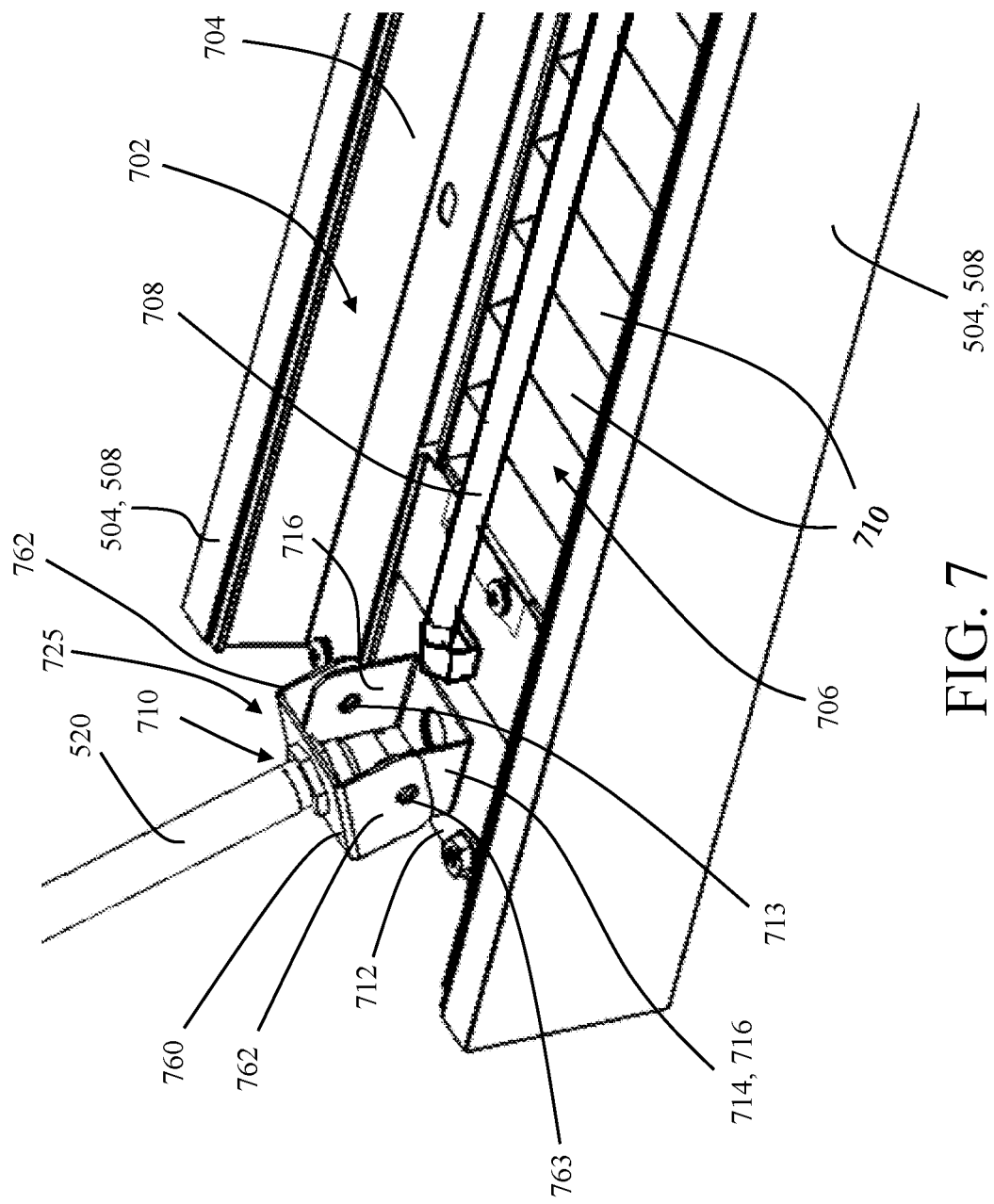
FIGS. 7-8 illustrate enlarged views of a portion of the perspective view of the example linear luminaire of FIG. 5 where the second end of the rigid pendant is coupled to the linear luminaire via a clevis swivel joint, in accordance with example embodiments of the present disclosure.
Figure 8:
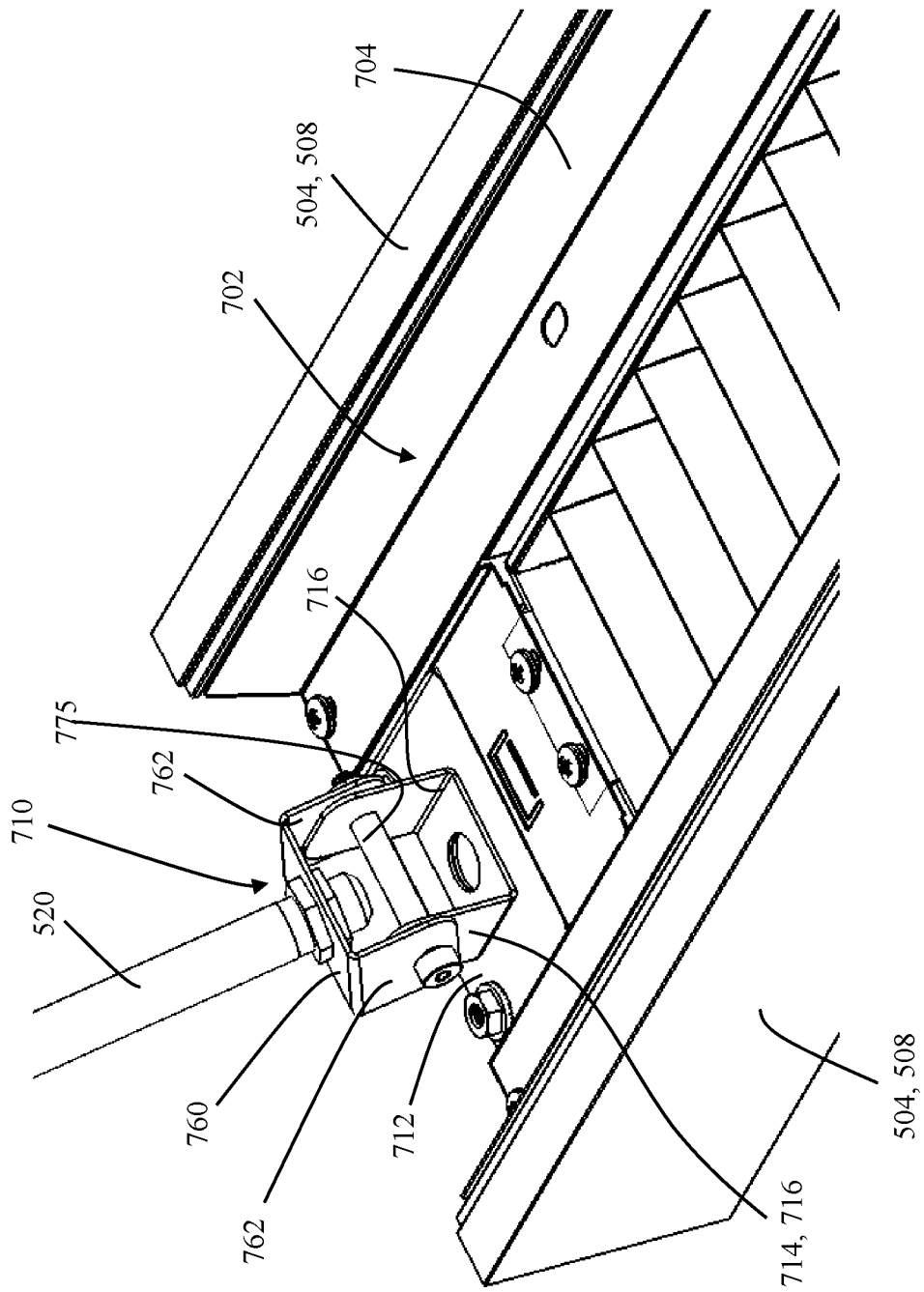

As illustrated in FIGS. 6-8, the opposite ends (610, 710) of each rigid pendant 520 may be threaded and may be configured to receive and removably couple a mounting surface coupling element and a luminaire coupling element thereto. As illustrated in FIG. 6, the mounting surface coupling element may be a ball swivel 670 that is coupled to one end of the rigid pendant 520, while the luminaire coupling element may be a U-shaped bracket 760 that is coupled to the opposite end of the rigid pendant 520 as illustrated in FIGS. 7 and 8. As illustrated in FIG. 6, the full swivel joint 612 between the mounting surface and the rigid pendant 520 may be defined by the ball swivel 670 that is coupled to the surface mounting bracket 690, where the surface mounting bracket 690 is configured to be coupled to the mounting surface, such as the ceiling 104 using fasteners. Further, as illustrated in FIG. 6, the full swivel joint 612 may be concealed by a canopy 695.

Turning to FIGS. 7-8, the clevis swivel joint 725 between the rigid pendant 520 and the linear luminaire 500 may be defined by the U-shaped bracket 760 that is pivotally coupled to the mounting bracket 714 of the linear luminaire 500. In one example embodiment, the mounting bracket 714 may be a U-shaped bracket. However, in other example embodiments, the mounting bracket 714 may be any other appropriate mounting member to which the rigid pendant can be coupled to define a clevis swivel joint that limits the movement of the linear luminaire along the length 'l' while preventing a tilting of the linear luminaire along the short side 510. For example, the mounting bracket 714 may be a solid block that has an opening formed therein to receive a fastener, such as a pin therethrough to pivotally couple with the U-shaped bracket 760 disposed at the second end 710 of the rigid pendant 520. Similarly, in some example embodiments, while the mounting bracket 714 is a U-shaped bracket, the luminaire coupling element that is disposed at the second end 710 of the rigid pendant 520 may be a solid block. In other words, the clevis swivel joint 725 between the rigid pendant 520 and the linear luminaire 500 may be defined by two U-shaped brackets (760, 714) that are pivotally coupled to each other using a fastener 775 as illustrated in FIG. 8, or any other appropriate components, such as a block and U-shaped bracket, that are coupled such that they limit the movement of the linear luminaire 500 along the length 'l' while preventing a tilting of the linear luminaire along the short side 510.

In the example embodiment illustrated in FIGS. 7-8, each arm 762 of the U-shaped bracket 760 disposed at the second end 710 of the rigid pendant 520 and each arm 716 of the U-shaped bracket 714 disposed on the linear luminaire 500 may have through holes (763, 713) formed therein, respectively. As illustrated in FIGS. 7-8, the U-shaped bracket 760 disposed at the second end 710 of the rigid pendant 520 and the U-shaped bracket 714 disposed on the linear luminaire 500 may be arranged such that arms 716 of the U-shaped bracket 714 is disposed between the arms 762 of the U-shaped bracket 760 and the through holes (763, 713) on the arms 716 of the U-shaped bracket 714 and the arms 762 of the U-shaped bracket 760 are axially aligned. Further, a fastener, such as a coupling pin 775 may be passed through the axially aligned through holes (763, 713) on the arms (716, 762) of the U-shaped brackets (714, 760) to pivotally couple the U-shaped brackets (714, 760), and thereby define the clevis swivel joint 725.

Even though the present disclosure describes clevis swivel joint being used with the linear luminaire 500 illustrated in FIGS. 5-10, one of skill in the art can understand and appreciate that the clevis swivel joint can be used along with any other appropriate linear luminaire, such as a slot luminaire, that is suspension mounted using at least two rigid pendants without departing from a broader scope of the present disclosure. Further, even though the present disclosure describes the linear luminaire with the clevis swivel joint being used in locations subject to earthquakes, one of skill in the art can understand and appreciate that the rigid pendant mounted linear luminaire with the clevis swivel joint can be used in any appropriate environment such as an outdoor location that is subject to strong winds, without departing from a broader scope of the present disclosure.

Although the present disclosure is described with reference to example embodiments, it should be appreciated by those skilled in the art that various modifications are well within the scope of the present disclosure. From the foregoing, it will be appreciated that an embodiment of the present disclosure overcomes the limitations of the prior art. Those skilled in the art will appreciate that the present disclosure is not limited to any specifically discussed application and that the embodiments described herein are illustrative and not restrictive. From the description of the example embodiments, equivalents of the elements shown therein will suggest themselves to those skilled in the art, and ways of constructing other embodiments of the present disclosure will suggest themselves to practitioners of the art. Therefore, the scope of the present disclosure is not limited herein.

What is claimed is:

1. A lighting system comprising:
   a linear luminaire comprising:
      a frame that is defined by a pair of side rails and a pair of end plates, the side rails defining a length of the linear luminaire and the end plates that are shorter than the side rails defining a width of the linear luminaire; and
      a light source disposed in an inner cavity defined by the frame; and
   at least two rigid pendants that are configured to suspension mount the linear luminaire from a mounting surface, wherein each rigid pendant comprises a swivel end and a clevis end, the swivel end attached to a ball swivel joint configured to attach to a mounting surface, the clevis end coupled to the linear luminaire via a clevis that prevents a tilting of the linear luminaire about a longitudinal axis of the linear luminaire, while allowing a movement of the linear luminaire along the longitudinal axis, wherein the longitudinal axis of the linear luminaire is an axis that is parallel to the side rails and transverse to the end plates of the linear luminaire, and wherein the linear luminaire meets seismic requirements.

2. The lighting system of claim 1, wherein the ball swivel joint allows motion of the linear luminaire along the longitudinal axis and along the width.

3. The lighting system of claim 1, wherein a first clevis of a first rigid pendant of the at least two rigid pendants is attached adjacent to a first end plate of the pair of end plates and a second clevis of a second rigid pendant of the at least two rigid pendants is attached adjacent to a second end plate of the pair of end plates.

4. The lighting system of claim 1, wherein the clevis is disposed on an end of each rigid pendant and pivotally couples with a coupling component disposed on the linear luminaire.

5. The lighting system of claim 4, wherein the coupling component is a U-shaped bracket.

6. The lighting system of claim 4, wherein the coupling component is a solid block that is configured to be received between a pair of arms of the clevis and pivotally couple with the clevis.

7. The lighting system of claim 1, wherein the clevis is disposed on the linear luminaire and pivotally couples with a coupling component disposed on an end of each rigid pendant.

8. The lighting system of claim 1, wherein the mounting surface is a ceiling.

9. A lighting system comprising:
a linear luminaire having a length and a width, where the length is longer than the width; and
at least two rigid pendants that are configured to suspension mount the linear luminaire from a mounting surface, wherein each rigid pendant comprises a swivel end and a clevis end, the swivel end attached to a ball swivel joint configured to attach to a mounting surface, the clevis end coupled to the linear luminaire via a clevis that allows the linear luminaire to swing along the length such that the linear luminaire meets a seismic requirement while preventing a tilting of the linear luminaire about a longitudinal axis along the length.

10. The lighting system of claim 9, wherein the at least two rigid pendants comprises two rigid pendants.

11. The lighting system of claim 9, wherein the ball swivel joint allows motion of the linear luminaire along the length and the width of the linear luminaire.

12. The lighting system of claim 9, wherein a first clevis of a first rigid pendant of the at least two rigid pendants is attached adjacent to a first end plate along the width of the linear luminaire and a second clevis of a second rigid pendant of the at least two rigid pendants is attached adjacent to a second end plate along the width of the linear luminaire.

13. A method comprising:
providing a linear luminaire having a length and a width, the length being longer than the width; and
providing at least two rigid pendants that are configured to suspension mount the linear luminaire from a mounting surface,
wherein each rigid pendant comprises a swivel end and a clevis end, the swivel end attached to a ball swivel joint configured to attach to the mounting surface, the clevis end coupled to the linear luminaire via a clevis such that a joint between each pendant and the linear luminaire is a clevis swivel joint that allows the linear luminaire to swing along the length such that the linear luminaire meets a seismic requirement while preventing a tilting of the linear luminaire about a longitudinal axis along the length.

14. The method of claim 13, wherein a first clevis of a first rigid pendant of the at least two rigid pendants is attached adjacent to a first end plate along the width of the linear luminaire and a second clevis of a second rigid pendant of the at least two rigid pendants is attached adjacent to a second end plate along the width of the linear luminaire.

15. The method of claim 13, wherein the clevis is coupled to and disposed on the linear luminaire, and wherein an end of each rigid pendant that is coupled to the linear luminaire comprises a coupling component disposed thereon, the coupling component being configured to pivotally couple with the clevis to define the clevis swivel joint.

16. The method of claim 15, wherein the coupling component is a U-shaped bracket.

* * * * *